Patented Apr. 13, 1954

2,675,334

UNITED STATES PATENT OFFICE 2,675,334

METAL COATING PROCESS

Daniel M. Gray and George L. Reymann, Sewickley, Pa., assignors to Stoner-Mudge, Inc., Pittsburgh, Pa., a corporation of Pennsylvania No Drawing. Application July 18, 1951,
Serial No. 237,493

6 Claims. (Cl. 117—132)

This invention relates to coating compositions capable of forming protective coatings upon the surfaces of tin plate and other metals from which diverse containers may be fabricated. It relates specifically to coating compounds in which the film-forming resinous component is an aromatic-soluble conjoint or simultaneous interpolymer of vinyl chloride and vinylidene chloride with or without other monomeric components, as hereinafter set forth, of great utility as food and beverage closure and container linings.

This invention is a continuation-in-part of that described in our co-pending and later abandoned application Serial No. 152,761, filed March 29, 1950.

Monomeric vinyl chloride is a chemical compound which corresponds to the formula $CH_2$—CHCl. It may be derived by reaction between hydrogen chloride and acetylene under proper conditions; it may be derived from ethylene chlorhydrin under well known reaction conditions; it may be derived from ethylene dichloride, or from ethylidene dichloride by removal of hydrogen chloride under certain reaction conditions. The use of vinyl chloride in the production of thermoplastic polymers and interpolymers is well known in the art.

Monomeric vinylidene chloride is a chemical compound corresponding to the formula $CH_2$—$C(Cl)_2$; it may be derived from methyl chloroform ($CH_3$—$C(Cl)_3$) by the action of a suitable base, and from trichlorethane ($CH_2Cl$—$CHCl_2$) by the action of a base, as is well known. And its use in the production of polymers and interpolymers is not new.

For the purposes of our precise definition, the resinous component of our improved container coating compositions may best be described as follows: The film-forming resin is composed of thermoplastic chemically saturated polymeric material made up exclusively of carbon, hydrogen and chlorine atoms and comprising units of a chloroethylene having from 1 to 2 chlorine atoms on one only of the ethylene carbons and is further characterized by possessing a chlorine content of about 61 to 64% by weight, by possessing a specific viscosity within the range of about 0.15 to 0.30 as determined at 20° C. using a 0.4% solution of the resin in nitrobenzene, and by possessing substantially complete solubility in aromatic hydrocarbons, by which is meant that at least 97% of the resin is completely soluble in the familiar aromatic hydrocarbons such as benzene, toluene and xylene. At weight concentrations of the resin up to and including 32 percent, solution viscosities are within a range which enables the compositions to be applied to surfaces by the usual means of application, such as roller coating, spraying and knifing. Polymeric materials containing only carbon, hydrogen and chlorine having such chloroethylene units in which the chlorine content may be from 61 to 64% and which are within the above definition, provided of course, that they possess the required viscosity and solubility characteristics, include certain interpolymers made from monomeric mixtures containing vinyl and vinylidene chloride only, or vinyl and vinylidene chloride together with polymerizable hydrocarbons or chlorinated hydrocarbons, such as styrene, dichlorostyrene, isobutylene and ethylene and mixtures of such interpolymers with each other or with other chlorine containing polymers such as polyvinyl chloride and polyvinylidene chloride which may result from the primary interpolymerization process. Polyvinyl chloride itself, and polyvinylidene chloride, are of course, not included since the chlorine content of the first named polymer is below 61% and the chlorine content of pure polyvinylidene chloride is above 64%.

Thus, of these interpolymers it may be said that they respond to the schematic formula ... —$CH_2$—$CX_n$— ... in which X is selected from the group consisting of hydrogen (H) and chlorine (Cl) and X has a value greater than 1.0 and less than 2.0; that such interpolymers are definitively characterized by being at least 97% completely soluble in the liquid benzenoid hydrocarbons in concentrations up to at least 32% by weight; and that their total content of chlorine lies between 61 and 64% by weight. These interpolymers are commercially available from the B. F. Goodrich Chemical Company under the designation "Geon 200 x 20".

As hereinafter fully set forth, these film-forming interpolymers are materially different from the familiar ketone-soluble vinyl polymers and copolymers which have heretofore been employed as coatings for "sanitary" food and beverage closures and containers.

Metal foils, screw-top jars, metal-capped bottles and metal cans are commonly used to package foodstuffs, beverages and the like to prevent desiccation and spoilage of the products and to facilitate handling them. However, in many cases, direct contact of the product with the metal may corrode the latter, and the resulting corrosion products are not only unsightly, but frequently contaminated and deteriorate the product as is well known. In the food and beverage packaging industries, therefore, the search goes on unceasingly for new and improved coating compositions which can be utilized in commercial practice to protect metallic foils, caps, closures, cans and other containers from such deleterious contact with the contents of the finished package.

A primary object of our invention is to provide inert, taste- and odor-free, corrosion-resistant and alcohol-resistant "sanitary" coating compositions with low moisture-vapor permeability for use on the surfaces of metal foils, caps, closures and containers which will subsequently come into contact with foods and beverages, that possess adequate adhesion to be capable of withstanding the usual fabrication, stamping, drawing, bending and other mechanical operations to which such metals must be subjected during fabrication, and which withstand the deleterious action of pasteurizing or other sterilizing processes which are of necessity employed in packaging foods and beverages in such containers.

Another object of our invention is to provide sanitary coating compositions in which the film-forming resinous component is present at solids contents appreciably higher than has heretofore been practicable with the usual vinyl chloride and vinyl chloride-acetate copolymer thermoplastic resins familiar to the art, and in which the solvent carriers are inexpensive and readily available aromatic hydrocarbons in contrast to the polar type ketones and esters which are necessary to formulate coatings with the vinyl chloride polymers and copolymers of commerce.

In the coating of metal with thermoplastic resins it is established practice to bring the resin into solution in an appropriate solvent or mixture of solvents, to spread the solution as a film upon the surface by such means as spraying, dipping, flushing or roller-coating and then to drive off the solvent. Practical considerations dictate the baking of the film-coated article. In order to effect adequate adhesion it is necessary to carry out this bake at temperatures which are, in the case of the usual chlorine-containing thermoplastic resins, close to or even in excess of that at which actual thermal decomposition of the resins may take place, as is well known. For this reason it has usually been necessary to add to such chlorine-containing polyvinyl resin coating compositions, diverse thermal stabilizers. These are not in themselves film-forming ingredients, and inevitably their use in even minimal concentrations imparts certain deleterious properties to the finally baked out film. Typically, the so-called "sterilization blush" resistance is inferior, by which the art means that the lacquered or coated metal container takes on a milky, spotted and hazy appearance after being sterilized under pasteurizing conditions.

Illustrative of certain of the stabilizers which are thus employed commercially are those described in U. S. Patents 2,130,924, 2,169,717, 2,208,216, and 2,288,765. These patents disclose stabilized coating compositions in which the resinous film-forming major components are the familiar vinyl chloride polymers and interpolymers with diverse other selected monomers.

All such earlier resins are characterized by the fact that their thermal decomposition point is so close to the temperature at which they must be baked in order to adhere them to the substrate metal that their use in unstabilized coating formulas for metal containers is not commercially practicable. Thus it comes about that one of the reasons for "priming" with oleoresinous varnishes and/or the use of blends with other resins which are themselves thermally stable, is to prevent thermal decomposition in cases where the addition of an active thermal stabilizer is undesirable.

The resinous interpolymers of the instant invention are in a different category. We have found that these interpolymers described in detail earlier in this specification wherein the total chlorine lies between 61 and 64% by weight—a surprisingly narrow range—possess sufficiently greater thermal stability as to be usable as coatings for metal containers without added stabilizers. For example, the familiar copolymer of vinyl chloride and vinyl acetate, in which the chlorine content approximates 49%, begins to decompose at around 285-290° F. on tin plate. Its decomposition temperature is even lower on clean iron surfaces. In contrast to this, the interpolymers of our present invention may be baked on tin plate at temperatures in the range of 315-325° F. without decomposing, and this temperature is significantly above that at which satisfactory adhesion to the metal substrate may be had (approximately 300° F.). Polyvinyl chloride itself (56.8% Cl) decomposes on metal surfaces below 300° F. Polyvinylidene chloride (73.2% Cl) decomposes at around 270° F.

The reason for this surprising added thermal stability within the close range of specified chlorine content is not known. Equally surprising, and at present inexplicable, is their paralleling solubility in simple liquid aromatic hydrocarbons. In fact, it is this latter property which makes them most attractive for coating purposes. It is a well known fact that chlorine-containing vinyl polymers generally are not aromatic soluble. Active polar solvents such as ethylene dichloride, dioxane, the nitroparaffins, ketones such as acetone, methyl ethyl ketone, methyl isobutyl ketone, isophorone, mesityl oxide and similar solvents are invariably required to be present in coating compositions in concentrations at least equal to that of the resin, if not higher. In such formulas the aromatic hydrocarbons of commerce, typically toluene, xylene, high-flash naphtha, and the so called Solvesso aromatic naphtha blends, are incorporated only as diluents to decrease the per gallon cost and to impart a measure of control on the rate of air drying (permitting "flow-out") before the final bake.

Obviously, then, it is a matter of great desirability to be able to formulate coating compositions in which only these relatively inexpensive and widely available liquid aromatic hydrocarbons need be employed as carriers—it being remembered that the only role of the solvent carrier is to enable deposition of a uniformly dispersed thin film of the resin component; thereafter the solvent component or components must be driven off and they are lost. Thus, in coating compositions based on thermoplastic resins, in which the resin content seldom can exceed 20% without resulting in excessively high viscosities, approximately 4 times as much material is wasted in solvent loss as is useful in the form of the protective film itself. Furthermore the cost of the required ketone-aromatic hydrocarbon solvent mixture is approximately twice that of a simple aromatic hydrocarbon. Thus in the case of the coating compositions of the present invention, due both to the higher concentration of resinous film-forming ingredients possible within the range of viscosities practicable for application and due also to the lower most of the simple aromatic solvents used, the total solvent cost to apply a given weight of solvent-free coating film is only 28% to 42% of the solvent cost to apply the same weight of a solvent-free coating film of a coating composition based on thermoplastic resins such as vinyl chloride-vinyl acetate copolymers dissolved in the required ketone-aromatic hydrocarbon solvent mixtures.

By way of example, the economic saving possible by the employment of the present invention for coating the interior surfaces of metal beverage containers, compared to the more familiar thermoplastic type coating compositions employing ketone-aromatic solvent mixtures, which coatings are now in commercial use for the same purposes, becomes obvious when it is considered that by means of the present invention the application of one pound of solvent-free film of our interpolymer requires the use of 2.3 to 3.4 pounds of simple aromatic hydrocarbon, having a total cost at today's markets of from eight to twelve cents; whereas the application of one pound of solvent-free film of vinyl chloride—vinyl acetate copolymer type resin requires the use of 4.0 to 5.0 pounds of ketone—aromatic hydrocarbon solvent mixture, having a total cost at today's market of from twenty-eight to thirty-five cents. Thus the present invention affords a saving in solvent costs of between sixteen and twenty-seven cents for every pound of solvent-free film applied. Because many millions of pounds of film-forming resins are utilized annually for the single purpose of lining the interior surfaces of metal beverage containers, the total savings in solvent costs alone made possible by the present invention, are obvious.

We have established that the aromatic solubility of our new particular interpolymers is independent of the molecular weight, and boiling point, of the aromatic solvent employed. This is in complete contrast to the behavior of the more familiar vinyl chloride polymers and copolymers of commerce, where solubility decreases (with consequent increase in solution viscosity) as the molecular complexity and boiling point of the polar type active solvent is increased. This independence of solubility characteristics with the specific structure of the aromatic solvent is decisively demonstrated by the data summarized in Table 1 below.

TABLE 1

*Viscosity of a typical Geon 200×20 interpolymer in various aromatic solvents*

| Solvent | Resin Solids, Percent by weight | Viscosity at 80° F. in Seconds (#4 Ford Cup) |
| --- | --- | --- |
| Benzene | 19.4 | 23 |
| Toluene | 19.6 | 19 |
| Xylene | 19.8 | 21 |
| Hi-flash naphtha | 19.6 | 26 |
| 50/50 toluene-xylene | 19.5 | 20 |
| 50/50 xylene-naphtha | 19.6 | 23 |
| 80/20 xylene-naphtha | 20.5 | 25 |

In our coating compositions we in general prefer to employ as solvents, only the liquid aromatic hydrocarbons and mixtures thereof. Typical of such liquid aromatic hydrocarbons are benzene, toluene, xylene, hi-flash naphtha, ethyl benzene, isopropyl benzene, and other commercially available liquid aromatic solvents. Usually, we prefer to employ a mixture of such solvents rather than a single pure hydrocarbon, to give controlled evaporation and lessen the likelihood of solvent blush or pinholing in the still-wet film as the volatile constituent evaporates away.

In some cases it may be desirable for other reasons, such as to aid in filtration of the liquid composition to produce a clear resin solution, to add small amounts of the lower alcohols such as ethanol, isopropanol or butanol. In no case, however, is there advantage in having more than 1 or 2 percent of these alcohols present, and their addition to our coating compositions is best determined by individual conditions and equipment available for manufacture of the coating. They act in all probability simply as scavengers for traces of occluded water left in the resin or moisture inadvertently introduced in manufacturing the solution. Such minor additions of alcohol may also assist in filtration by repressing the partial solvation and gellation of fine particles of extremely high molecular weight product, extraneously present to the extent of no more than 3 percent and frequently even less than 1 percent by weight, in the interpolymers of this invention. These extremely high molecular weight fractions are not truly soluble in simple aromatic hydrocarbon solvents; on contact with aromatic hydrocarbons in the absence of alcohols they appear to swell and become gelatinous, thus tending to clog the passages in filtering surfaces, thereby impeding filtration and substantially reducing the rate of flow. If not removed by such means as by filtration, the presence of minute amounts of these partially solvated particles give the solution a cloudy appearance; they may settle on long standing into a gelatinous opaque layer in drums or pails of the coating solution. Although the presence of particles of this insoluble fraction in the dry film obtained after the solvents are expelled from such unfiltered liquid compositions, is not observable and does not have any deleterious effect on the ultimate film properties, on the other hand their removal from the liquid composition prior to application to surfaces, certainly does not detract from the film properties. Consequently filtration, made possible by the additions of small amounts of alcohol to the aromatic hydrocarbon solvent mixture before adding the resin to the solvent mixture to make the coating solution, by removing these gel particles, yields the perfectly clear liquid coating compositions generally expected and preferred by coating users.

We may also employ in the solvent mixture of our coating compositions, minor amounts of ketone and ester solvents such as methyl ethyl ketone, methyl isobutyl ketone, cyclohexanone, isophorone, ethyl acetate and butyl propionate, in special cases where it is desired to obtain even higher resin solids at a given viscosity than can be obtained with aromatic hydrocarbons alone, and where solvent cost is a minor consideration. We emphasize, however, that the employment of ketones and esters is not a necessary requirement for effectuating substantially complete solution of our resinous interpolymers and that entirely acceptable coating solutions are obtained by the employment of aromatic hydrocarbon solvents alone.

It should be pointed out that ketones and esters, although they may reduce solution viscosities somewhat when present with aromatic hydrocarbons, do not perform a function equivalent to that of small amounts of the lower alcohols in facilitating the filtration of the coating solution. As a matter of fact the presence of ketones and esters, without the small amounts of the added alcohols in the solvent mixture with aromatic hydrocarbons, may actually aggravate filtration difficulties.

The relatively higher cost of ketones and esters compared to that of aromatic hydrocarbons generally limits their employment in such solvent mixtures to not over 15 percent of the total solvent mixture used in the coating compositions of the present invention. We have established that ketones and esters employed in amounts not to exceed 15 percent of the solvent mixture neither degrade nor improve the dry film properties of our composition, in which respect their effect is markedly different from that resulting from their employment in compositions based on the familiar vinyl chloride-vinyl acetate copolymer resin films, wherein the film properties usually show an improvement with increases in the ketone or ester content of the solvent mixture. It is thus quite clear that the employment of ketones or esters in combination with aromatic hydrocarbons in the solvent mixtures of the present invention is a purely optional matter where special requirements exist, and that for many reasons we prefer to employ a solvent mixture comprised of at least 98 percent aromatic hydrocarbon solvent, the balance usually being an alcohol.

Summarizing, our interpolymers may be dissolved in aromatic solvents to make highly useful coating compositions at solids contents well in excess of those presently available in the art, and these desirably high solids values are obtained without employing expensive polar type solvents admixed with the aromatic liquids. The data in Table 2, obtained with a typical interpolymer dissolved in toluene, are illustrative of this finding.

TABLE 2

*Variation in viscosity with solids content*

| % Solids in toluene | Viscosity Seconds (#4 Ford Cup), at 80° F. |
|---|---|
| 34.2 | 300 |
| 31.1 | 130 |
| 29.9 | 75 |
| 27.2 | 45 |
| 25.0 | 31 |
| 20.0 | 20 |
| 15.0 | 15 |

The following examples will serve to illustrate our invention, it being understood that we are not limited to the specific formulas and ingredients therein recited, and that pigments, dyes, waxes and other similar ingredients may be added to the otherwise clear compositions to provide decorative and similar effects, without departing from the scope of the invention.

EXAMPLE 1

A resinous interpolymer comprising approximately 26% by weight of vinylidene chloride and 74% of vinyl chloride having a chlorine content of 61.2% available commercially from the B. F. Goodrich Chemical Company under the designation Geon 200 x 20 and characterized by a specific viscosity of 0.15 determined at 20° C. in a 0.4% solution in pure nitrobenzene, was dissolved in a 50/50 mixture of toluene and xylene to a solids content of 19.5%. The resulting solution had a No. 4 Ford Cup viscosity of 20.7 seconds at 80° F. This was coated on commercial tin plate by dip application at a coating weight of 5 milligrams per square inch and thereafter baked 15 minutes at 315° F. The resulting clear coated tin plate had excellent pasteurization blush resistance; the lacquer adhesion was rated as completely acceptable, judged by ability of the coating to withstand fabrication into screw caps without rupture or damage to the coating; there was no evidence of thermal breakdown of the coating due to the bake. Contact exposure to a variety of food and beverage products showed no attack on the lacquered tin plate, and no discoloration nor contamination nor off-taste of the contacting food or beverage.

EXAMPLE 2

A solution of the interpolymer of Example 1 was dissolved in high flash naphtha to a solids content of 29.9%. The resulting coating composition was roller-coated onto chemically treated black iron sheets at the usual wet film weight, which sheets were then baked for 20 minutes at 310° F. Thereafter, can body ends were fabricated from these sheets which were then assembled to separately lacquered tin plate can bodies; and these were filled with a typical food product. After closing and sterilizing for 20 minutes at 210° F. in a water-bath, the cans were shelf-stored for 8 weeks. Upon being opened it was found that the food contents had been completely protected from deleterious contact with the metal, and the can ends were in excellent condition.

EXAMPLE 3

The resinous interpolymer of Example 1 was dissolved in a mixture of 99 parts toluene and 1 part isopropanol at 25.0% solids. After filter-pressing, the resulting clear solution had a No. 4 Ford Cup Viscosity of 31 seconds. This was spray applied as a clear lacquer onto can bodies previously formed from tin plate primed with an oleoresinous baking varnish, and the sprayed can bodies were then baked 10 minutes at 300° F. To other sheets of tin plate, previously primed with an oleoresinous baking varnish, was applied by roller coating, the composition of Example 2, and after baking 15 minutes at 335° F., the sheets were fabricated into can ends. After attaching to the bodies one of the ends thus prepared, these cans were filled with beer, closed with the other end and pasteurized in the usual manner. After 8 weeks shelf storage they were opened and the contents examined for off-taste, cloud, and metal pick-up. The results were completely satisfactory in all respects.

EXAMPLE 4

A resinous interpolymer comprising approximately 44.5% by weight of vinylidene chloride and 55.5% of vinyl chloride having a chlorine content of 63.9% was dissolved in 95/5 mixture of toluene and hi-flash naphtha to a solids content of 32%. To 100 parts of the resulting clear solution was added 1 part of a soluble red dye. This composition had a No. 4 Ford Cup viscosity of 200 seconds. Applied to aluminum foil and thereafter baked for 15 seconds at 350° F., the resulting red lacquered foil could be folded, bent and otherwise mechanically formed without rupture or damage to the protective coating. Closures for glass milk bottles were stamped from it and were used to close the opening of bottles filled with milk. After 12 days handling under the usual wet conditions of storage the closure presented the same attractive appearance and there was no etching, staining or dulling as would result with uncoated aluminum closures of this type in contact with moisture and subject to the usual mechanical handling.

EXAMPLE 5

A resinous interpolymer comprising approximately 37% by weight of vinylidene chloride and 63% of vinyl chloride having a chlorine content of 62%, was dissolved in a mixture of 86 parts toluene, 12 parts methyl ethyl ketone and 2 parts ethanol at 25% solids. After filtering, the resulting clear solution, which had a No. 4 Ford Cup viscosity of 29 seconds, was spray applied to previously formed and soldered can bodies made of plain tin-plate, to yield a dry film weight, after baking 10 minutes at 305° F., of 7 milligrams per square inch. Can ends formed from tin plate roller coated with the composition of Example 2, were applied to one end of the can body coated as described, and after filling with a vegetable juice beverage, this was sealed with the other can end, and sterilized at 180° F. for 13 minutes. At the end of three months storage, the juice was found to be in excellent condition, with no off flavor or odor, such as is sometimes imparted to such products by oleoresinous linings. The metal of the can body showed no signs of etching or other attack.

We claim as our invention:

1. A process of lining an interior metal surface of a container for food and the like, comprising coating on said metal surface a composition comprising resin dissolved in solvent, the total mixture of resin and solvent having a concentration of resin of substantially 15 to 32 per cent by weight, said solvent consisting of not more than 15 per cent of a material selected from the group consisting of methyl ethyl ketone, methyl isobutyl ketone, cyclohexanone, isophorone, ethyl acetate and butyl propionate, the balance of said solvent consisting substantially entirely of at least one liquid aromatic hydrocarbon, and said resin consisting of an interpolymer of vinylidene chloride and vinyl chloride in proportions of substantially 26 to 44.5 per cent by weight of vinylidene chloride, the interpolymer having a chlorine content of substantially 61 to 64 per cent by weight and possessing a specific viscosity of substantially 0.15 to 0.30 determined at 20° C. in 0.4 per cent solution of nitrobenzene, and baking said coating onto said metal surface at a temperature of at least 300° F.

2. A process of lining an interior metal surface of a container for food and the like, comprising coating on said metal surface a composition comprising resin dissolved in solvent, the total mixture of resin and solvent having a concentration of resin of substantially 15 to 32 per cent by weight, substantially all of said solvent being selected from the group consisting of xylene and toluene and mixtures thereof, and said resin consisting of an interpolymer of vinylidene chloride and vinyl chloride in proportions of substantially 26 to 44.5 per cent by weight of vinylidene chloride, the interpolymer having a chlorine content of substantially 61 to 64 per cent by weight and possessing a specific viscosity of substantially 0.15 to 0.30 determined at 20° C. in 0.4 per cent solution of nitrobenzene, and baking said coating onto said metal surface at a temperature of at least 300° F.

3. A process of lining an interior iron surface of a container for food and the like, comprising coating on said metal surface a composition comprising resin dissolved in solvent, the total mixture of resin and solvent having a concentration of resin of substantially 15 to 32 per cent by weight, said solvent consisting of not more than 15% of a material selected from the group consisting of methyl ethyl ketone, methyl isobutyl ketone, cyclohexanone, isophorone, ethyl acetate and butyl propionate, substantially the entire balance of said solvent being selected from the group consisting of toluene and xylene and mixtures thereof, and said resin consisting of an interpolymer of vinylidene chloride and vinyl chloride in proportions of substantially 26 to 44.5 per cent by weight of vinylidene chloride, the interpolymer having a chlorine content of substantially 61 to 64 per cent by weight and possessing a specific viscosity of substantially 0.15 to 0.30 determined at 20° C. in 0.4 per cent solution of nitrobenzene, and baking said coating onto said metal surface at a temperature of at least 300° F.

4. A process of lining an interior tinplate surface of a container for food and the like, comprising coating on said metal surface a composition comprising resin dissolved in solvent, the total mixture of resin and solvent having a concentration of resin of substantially 15 to 32 per cent by weight, said solvent consisting of not more than 15% of a material selected from the group consisting of methyl ethyl ketone, methyl isobutyl ketone, cyclohexanone, isophorone, ethyl actate and butyl propionate, substantially the entire balance of said solvent being selected from the group consisting of toluene and xylene and mixtures thereof, and said resin consisting of an interpolymer of vinylidene chloride and vinyl chloride in proportions of substantially 26 to 44.5 per cent by weight of vinylidene chloride, the interpolymer having a chlorine content of substantially 61 to 64 per cent by weight and possessing a specific viscosity of substantially 0.15 to 0.30 determined at 20° C. in 0.4 per cent solution of nitrobenzene, and baking said coating onto said metal surface at a temperature of at least 300° F.

5. A process of lining an interior iron surface of a container for food and the like, comprising coating on said metal surface a composition comprising resin dissolved in solvent, the total mixture of resin and solvent having a concentration of resin of substantially 15 to 32 per cent by weight, substantially all of said solvent being selected from the group consisting of xylene and toluene and mixtures thereof, and said resin consisting of an interpolymer of vinylidene chloride and vinyl chloride in proportions of substantially 26 to 44.5 per cent by weight of vinylidene chloride, the interpolymer having a chlorine content of substantially 61 to 64 per cent by weight and possessing a specific viscosity of substantially 0.15 to 0.30 determined at 20° C. in 0.4 per cent solution of nitrobenzene, and baking said coating onto said metal surface at a temperature of at least 300° F.

6. A process of lining an interior tinplate surface of a container for food and the like, comprising coating on said metal surface a composition comprising resin dissolved in solvent, the total mixture of resin and solvent having a concentration of resin of substantially 15 to 32 per cent by weight, substantially all of said solvent being selected from the group consisting of xylene and toluene and mixtures thereof, and said resin consisting of an interpolymer of vinylidene chloride and vinyl chloride in proportions of substantially 26 to 44.5 per cent by weight of vinylidene chloride, the interpolymer having a chlorine content of substantially 61 to 64 per cent by weight and possessing a specific viscosity of substantially 0.15 to 0.30 determined at 20° C. in 0.4 per cent solution of nitrobenzene, and baking said coating onto said metal surface at a temperature of at least 300° F.

References Cited in the file of this patent

UNITED STATES PATENTS

| Number | Name | Date |
|---|---|---|
| 1,230,958 | Warga | June 26, 1917 |
| 2,122,537 | Pfeffer | July 5, 1938 |
| 2,316,197 | Tucker | Apr. 13, 1943 |
| 2,334,236 | Arnold et al. | Nov. 16, 1943 |
| 2,393,006 | Vincent | Jan. 15, 1946 |
| 2,395,894 | May | Mar. 5, 1946 |
| 2,565,518 | Peterson et al. | Aug. 28, 1951 |